2,750,366
Patented June 12, 1956

2,750,366

MONO-ACYL DERIVATIVES OF ALKYLENE DIAMINES AND PROCESS FOR PREPARING SAME

Otto Turinsky, Western Springs, Ill., assignor to Armour and Company, Chicago, Ill., a corporation of Illinois No Drawing. Application February 16, 1952,
Serial No. 271,975

6 Claims. (Cl. 260—97.5)

This invention relates to new derivatives of alkylene diamines and more particularly it relates to new monoacyl derivatives of alkylene diamines and to new processes for preparing these compounds.

Mono-acyl derivatives of alkylene diamines contain both the amido and the amino groups in the molecule and are accordingly termed amidoamine. They are formed by replacing one of the hydrogen atoms of one of the $NH_2$ groups of a diamine with an acyl group.

The amidoamines derived from rosin acids have heretofore been unreported and no method for their preparation has been known. I have now discovered a process which produces a near quantitative yield of the rosin acid amidoamines and which at the same time holds the formation of diamides to a minimum.

The amidoamines derived from rosin acids in accordance with the practice of the present invention have a wide range of industrial application. I have found these compounds useful as asphalt emulsions for road surfaces; as insecticides, herbicides and pharmaceuticals; in the flotation of minerals; in emulsion paints, paper coatings and cutting oils; as detergents, plasticizers and resin waxes, etc.

The process by which I prepare rosin acid amidoamines comprises mixing and heating the rosin acid with an excess of an alkylene diamine at superatmospheric pressure at temperatures of 300° C. and above for a period of from a few minutes to several hours, the length of time necessary to complete the reaction depending on the temperature employed.

I have found that for effective conversion to the amidoamine the reaction is advantageously carried out in a closed system. The reaction proceeds smoothly with yields of as high as 97% of the amidoamine when a bomb is employed as the reaction chamber.

My process is operable at temperatures of 300° C. and above with the time necessary for the reaction dependent on the temperature employed. At a temperature of about 300° C., for example, the reaction proceeds slowly while at temperatures of about 365° C. conversion to the amidoamine proceeds rapidly in a matter of minutes.

While temperatures above 365° C. may be employed in my process, no practical advantage flows from the use of such elevated temperatures and I prefer to carry out the reaction at temperatures between 300° and 365° C.

Any alkylene diamine may be used in my process. Ethylene diamine and hexamethylene diamine are examples of diamines that may be advantageously employed. I prefer to employ from 3 to 9 moles of the diamine for each mole of the acid and have found that a commercial (70%) solution of ethylene diamine is particularly satisfactory. When the reaction is complete the excess diamine can readily be removed at reduced pressure and recovered for reuse in the process.

As the acid component of the reaction I may use any rosin acid. As rosin acids I include abietic acid, stabilized abietic acid and naturally-occurring resin acids. When preparing the abietic acid amidoamine I prefer to use the abietic acid found in tall oil.

In addition to producing the heretofore unknown rosin acid amidoamines, I have found that my process greatly improves the yield of the amidoamines derived from the higher fatty acids and from aromatic acids. By the term higher fatty acids I refer to aliphatic acids having from 8 to 18 carbon atoms in the carbon chain. Examples of these acids are caprylic, capric, lauric, myristic, palmitic and stearic acid. Mixed fatty acids, as for example crude or refined tall oil, fatty acids from linseed and cottonseed oils, and tallow acids may also advantageously be reacted according to my process to form the corresponding amidoamine. Aromatic acids including benzoic, salicylic and anthranilic acid may also suitably be employed in my process.

In one embodiment of my invention the formation of the amidoamine derived from abietic acid was carried out as follows:

Refined (white) abietic acid with a melting point of 154–161° C. was prepared from tall oil by repeated crushing and washing with Skellysolve to separate out fatty acids. A mixture of 30 grams of the refined abietic acid and 85 cc. (an 8.5 molar excess) of 70% solution of ethylene diamine was heated with stirring in the glass liner of a bomb until solution was complete. The heating was then continued in the bomb without shaking. After vapors appeared the bomb valve was closed and heating continued until the temperature reached 320° C. One hour was required to reach this temperature. Heating was continued for an additional two hours. Upon cooling the amidoamine, a pale yellow, transparent, viscous liquid, settled out as a separate phase. The ethylene diamine was decanted and the reaction product was washed three times with boiling water by decantation, after vigorous stirring, settling and cooling, and finally dried in vacuo at 95° C. The yield was 34.2 grams of a pale yellow, transparent solid which melted indefinitely to a viscous liquid at about 40° C. This product assayed 91.5% abietic amidoamine on titration with HCl.

The following examples will further illustrate specific embodiments of my new process but it will be understood that the invention is not limited thereto.

Example 1

30.2 grams of refined (white) abietic acid was heated for 1¼ hours in a glass liner in a bomb at a temperature of 310–350° C. with 85 cc. (8.5 molar excess) of 70% ethylene diamine solution. This reaction yielded 32 grams (82% by titration) amidoamine and 7.8% unreacted abietic acid. The product was pale, transparent, hard, low melting and assayed 7.3% nitrogen.

Example 2

90.6 grams crude tall oil was heated for ¼ hour directly in a bomb at a temperature of 360–364° C. with 200 cc. (6.5 molar excess) of 70% ethylene diamine solution. The yield of amidoamine was 112.4 grams (82% by titration) and the amount of unreacted abietic acid was 5.7%. The calculated yield of amidoamine was 103.5 grams. The product was dark and low melting.

Example 3

84.6 grams of tallow acids was heated for 22 minutes directly in a bomb at a temperature of 350–364° C. with 200 cc. (6.7 molar excess) of 70% ethylene diamine solution. The product was a tan-colored solid. The yield of the amidoamine was 110 grams as against a theoretical yield of 97 grams, the free fatty acid found was 2.7% and the product developed an ammoniacal odor on standing.

Example 4

13.9 grams of recrystallized (white) abietic acid was refluxed (an open system) for 22 hours with 30 cc. (6.6 molar excess) of 70% ethylene diamine solution. No reaction took place, the yield of amidoamine was nil and there was 13.7 grams of unreacted abietic acid recovered.

The effectiveness of my process in preparing aliphatic amidoamines in increased yield is illustrated by the following example showing the reaction between a higher fatty acid and ethylene diamine.

A mixture of 71 grams of triple pressed stearic acid having a neutral equivalent of 275, and 200 cc. (a 7.7 molar excess) of commercial (70%) ethylene diamine was heated and stirred in the open bomb until solution was complete. Heating was then continued without stirring or shaking with the bomb cap in place but with the valve open until vapors started to escape. The bomb valve was then closed and heating continued. The desired reaction temperature, 320° C. in this case, was attained after one hour and then maintained for two hours. The excess ethylene diamine was removed at 100° C. under reduced pressure. The residue was taken up in 250 cc. of hot 95% ethyl alcohol and filtered hot. The white precipitate after washing several times with alcohol-acetic acid mixture and drying weighed 3.3 grams, had a melting point of 144–146° C., and consisted of diamides of stearic acid and palmitic acid. On cooling the filtrate to −5° C. and filtering, 27.6 grams of free amidoamine, dried in a vacuum, was obtained. As the amidoamine remaining in solution could not be readily recovered by further recrystallization, it was recovered as the insoluble carbamate

The overall yield in terms of free amidoamine was 88.9% of the theoretical figure.

The following examples illustrate further specific embodiments of my invention.

Example 5

Twenty grams of purified lauric acid was heated for 2 hours in a bomb at a temperature of 295–305° C. with 85 cc. (8.5 molar excess) of 70% ethylene diamine solution. The yield of amidoamine was 17.3 grams, 1.2 grams of the diamide formed and the product was white containing 11% free fatty acid.

Example 6

Twenty grams of purified lauric acid was heated for ½ hour in glass liner in a bomb at a temperature of 340–360° C. with 85 cc. (8.5 molar excess) of 70% ethylene diamine solution. The reaction product was white. The yield of amidoamine was 17.4 grams, 1.5 grams of diamide was formed but no free fatty acid.

Example 7

A mixture of 7.1 grams of stearic acid and 11.6 grams (3 molar excess) of hexamethylene diamine was heated in a glass liner in a stainless steel bomb. When a temperature of 355° was attained (after heating for one hour) the bomb was cooled by quenching in tap water. On recrystallizing from 3A alcohol the yield of amidoamine was 90% of the theoretical value.

Example 8

137.8 grams of triple pressed stearic acid was heated for 1 hour directly in a bomb at a temperature of 340–354° C. with 47.5 grams (0.1 molar excess) of 70% ethylene diamine solution plus 90 grams water. No amidoamine formed, but much soap was formed. The product was a white tan color except for a small dark residue. Fifty-six per cent diamide was formed.

Example 9

109.6 grams of triple pressed stearic acid was heated for 30 minutes directly in a bomb at a temperature of 360° C. with 196.8 grams (4.75 molar excess) of 70% ethylene diamine solution. The reaction yielded 91.6% amidoamine and 8.5% diamide. No soap was formed and the product was white except for a very small dark heavy residue.

Example 10

Twenty grams of salicylic acid was heated for 3 hours in glass in a bomb at a temperature of 310–320° C. with 85 cc. (5.6 molar excess) of 70% ethylene diamine solution. The product was a tan colored, clear liquid, titrating 77.6% primary amine.

Example 11

Twenty grams of anthranilic acid was heated for 2 hours in glass in a bomb at a temperature of 320–330° C. with 85 cc. (5.6 molar excess) of 70% ethylene diamine solution. The yield of amidoamine was 19.8 grams and the product was a clear, tan, viscous liquid.

Hexamethylene diamine may also be reacted with rosin acids in accordance with the process of my invention to prepare the corresponding amidoamines. In this case also the reaction proceeds to substantial completion in a matter of a few minutes at a temperature of about 365° C.

While in the foregoing specification I have set forth certain details and specific steps, it will be understood that variations therein may be made by those skilled in the art without departing from the spirit of my invention.

I claim:

1. A process for the preparation of amidoamine which comprises heating in a substantially sealed system at a temperature of at least 300° C. a mixture comprising a monocarboxylic acid selected from the group consisting of higher fatty acids having from 8 to 18 carbon atoms, rosin acids, and mixtures of rosin and higher fatty acids having from 8 to 18 carbon atoms, and an alkylene diamine having from 2 to 6 carbon atoms in the alkylene radical and having 2 primary amine groups, said diamine being present in a molar ratio of at least 3 to 1.

2. A process according to claim 1 wherein the molar ratio of diamine to acid is between 3:1 and 9:1.

3. A process according to claim 1 wherein the mixture is heated to between 300 and 365° C.

4. A process according to claim 1 wherein the monocarboxylic acid is a fatty acid containing from 8 to 18 carbon atoms in the carbon chain.

5. A process according to claim 1 wherein the monocarboxylic acid is a mixture of rosin and fatty acids as derived from tall oil.

6. In a process for preparing the mono-abietyl derivative of an alkylene diamine having the general formula $H_2N-R^1-NH_2$ in which $R^1$ is a polymethylene group having from 2 to 6 carbon atoms, the improvement characterized by the steps of mixing the diamine and abietic acid in a molar ratio of diamine to acid respectively of from 3:1 to 9:1, and heating the mixture in a sealed system to between 300 and 365° C.

References Cited in the file of this patent

UNITED STATES PATENTS

| Number | Name | Date |
|---|---|---|
| 1,534,525 | Hartman | Apr. 21, 1925 |
| 2,132,388 | Berchet | Oct. 11, 1938 |
| 2,304,369 | Morgan | Dec. 8, 1942 |
| 2,589,674 | Cook | Mar. 18, 1952 |
| 2,602,805 | Percy | July 8, 1952 |